United States Patent [19]
Deslauriers

[11] 3,889,863
[45] June 17, 1975

[54] STRIPPING MACHINE

[76] Inventor: Clovis F. Deslauriers, 25-52 Borough Pl., Woodside, N.Y. 11377

[22] Filed: Mar. 30, 1973

[21] Appl. No.: 346,337

[52] U.S. Cl............................. 225/99; 93/36 A
[51] Int. Cl............................................. B26f 3/00
[58] Field of Search ............... 225/98, 99; 93/36 A; 83/331

[56] References Cited
UNITED STATES PATENTS

| | | | |
|---|---|---|---|
| 1,609,004 | 11/1926 | Steele | 83/78 X |
| 2,508,083 | 5/1950 | Winkler | 225/99 X |
| 2,615,376 | 10/1952 | Pellhan | 83/331 X |
| 3,459,080 | 8/1969 | Goettsch | 93/36 A X |
| 3,524,364 | 8/1970 | Bishop | 93/36 A X |

*Primary Examiner*—Andrew R. Juhasz
*Assistant Examiner*—Leon Gilden
*Attorney, Agent, or Firm*—Weiser, Stapler & Spivak

[57] ABSTRACT

A stripping machine including a feed conveyor which carries previously die cut blanks to the nip of a pair of feed rollers. The feed rollers deliver the die cut blanks to the waste stripping mechanism which comprises a stripping blade shaft and a plurality of stripping blades mounted upon the shaft in transversely spaced relationship. The individual stripping blades are fabricated to a greater diameter than the feed rollers and serve to urge the scrap sections downwardly relative to the path of travel of the blanks. The finished die cut products travel horizontally through the spaces defined between the individual stripping blades wherein they are carried by delivery rollers to a delivery section. A waste conveyor receives the scrap from the stripping blades and automatically delivers the waste material to a point of disposal.

6 Claims, 5 Drawing Figures

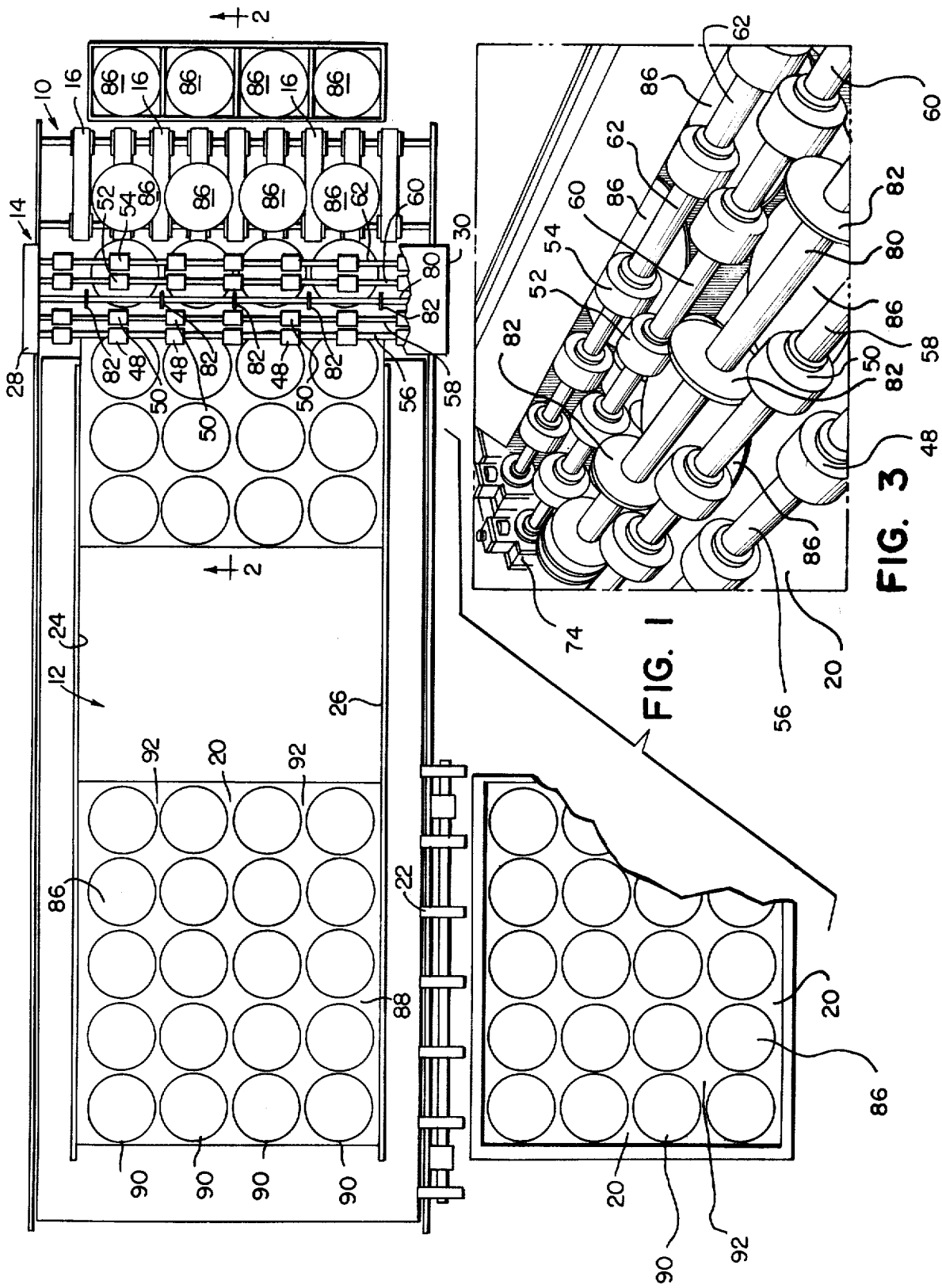

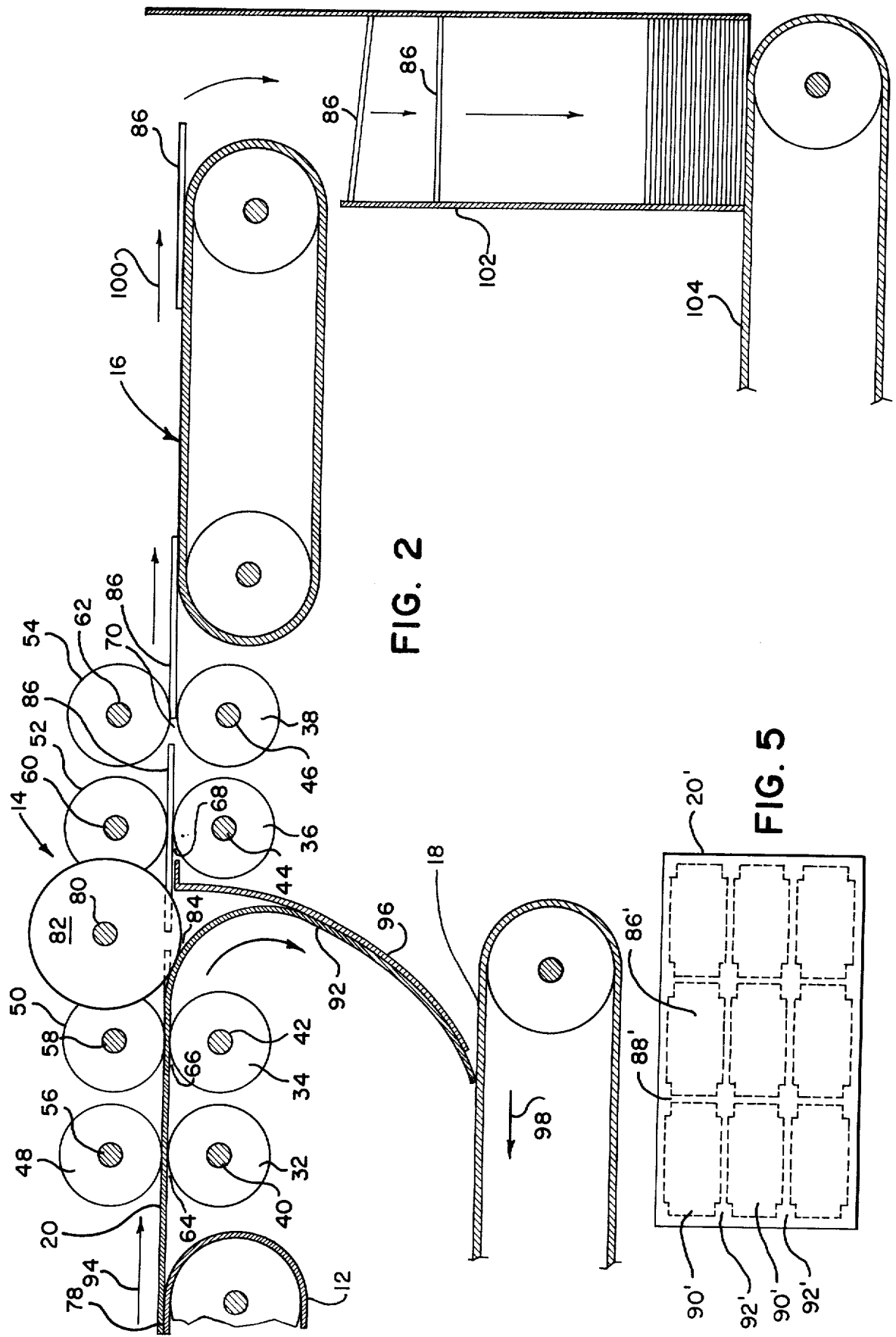

STRIPPING MACHINE

BACKGROUND OF THE DISCLOSURE

The present invention relates in general to the paper converting industry, and more particularly, is directed to a conveyor type of machine finding utility in stripping the waste material from previously die cut sheet material.

The present invention is designed for use in the paper converting industry, particularly in the stripping and stacking operations. It is the present practice to employ automatic die cutting equipment to die cut sheet material such as corrugated board, cardboard, sheet plastic and the like, and these machines generally deliver the die cut sheets in skid loads with the die cut waste portions still attached. It is common to employ manually operated air hammers or similar manual operations to strip the waste outer edges of the die cut products and this method is also employed whenever possible to strip the internal waste material of the die cut products. In many instances, it is not economically feasible to remove internal scrap materials and accordingly, the die cut sheets are delivered to the user with the internal waste still affixed.

There is also presently available certain types of automatic equipment for use in stripping previously die cut sheets, but such equipment has proved generally costly in operation inasmuch as such machines must be manually set up and timed to match each particular product that is fed from the die cutting machine. Additionally, the previously available machines were subject to considerable down time to accomplish the relatively precise adjustments that were necessary to enable the machine to satisfactorily operate with a given die cut configuration. The prior art machines tended to be quite complicated in construction and in operation and were, therefore, costly to produce and costly to operate.

SUMMARY OF THE INVENTION

The present invention relates in general to die cut stripping machine, and more particularly, is directed to a conveyor fed machine of extremely basic construction for stripping the waste from previously die cut sheet material.

The stripping machine of the present invention receives previously die cut sheets individually on an input conveyor which serves to feed the blanks individually toward the stripping section. The machine is equally applicable for use with corrugated board, cardboard, sheet metal or sheet plastic materials. The die cut operation should be designed to provide a plurality of transversely spaced, longitudinal aisles which cooperate with transversely spaced stripping blades to facilitate the stripping operation.

The present device incorporates a stripping section which includes a rotatable, transverse, stripping blade shaft upon which are adjustably mounted a plurality of stripping blades. The stripping blades are easily, manually adjustable transversely along the stripping blade shaft and a sufficient number of stripping blades are provided to permit one such stripping blade to longitudinally align wtih each of the aisles defined in the die cut sheets.

The previously die cut sheets are individually fed to the stripping section by the input conveyor which carries the sheets to the nip of at least one pair of input rollers. The stripping blades position rearwardly of the input rollers and are fabricated to a diameter approximately 25 per cent greater than that of the input rollers. The stripping blade shaft positions on the machine relative to the nip of the input rollers in a manner to project the bottom of the stripping blades below a plane drawn through the horizontal path of travel of the die cut sheets. Thus, as the sheets are fed through the machine, the finished die cut and stripped product travels through the space between the transversely spaced stripping blades under impetus of the pairs of rollers in the stripping section and the waste portions contact the stripping blades at the previously designed longitudinal aisles. The downward projection of the spaced stripping blades causes the waste material to travel downwardly out of the plane of the path of travel of the finished product and this waste material is then directed to a lower positioned scrap conveyor for disposal purposes.

At least one pair of cooperating delivery rollers receive the finished product from the stripping blades and serve to convey the finished product to a desired point of delivery, such as to a delivery conveyor for transport to a conventional stacking rack. The present machine operates completely without the need for pads which must be precisely positioned for stripping, or for blowers or vibrators, or other costly or time consuming stripping devices. The apparatus is capable of continuous operation with similarly die cut sheets and can be automatically operated with little need for manual intervention. Only minor adjustments will be required when a different die cut pattern is to be stripped.

It is therefore an object of the present invention to provide an improved stripping machine of the type set forth.

It is another object of the present invention to provide a novel stripping machine capable of stripping previously die cut sheet material in an automatic manner.

It is another object of the present invention to provide a novel stripping machine which is capable of rapidly and automatically stripping previously die cut blanks while employing only a minimum of mechanical apparatus.

It is another object of the present invention to provide a novel stripping machine wherein the blanks are die cut to provide transversely spaced, longitudinal aisles and wherein the machine is equipped with stripping blades which are transversely adjustable for longitudinal alignment with the aisles for the waste stripping operation.

It is another object of the present invention to provide a novel die cut sheet stripping machine that is capable of accommodating various sized sheet materials and stripping the same with a minimum of down time for set up operation.

It is another object of the present invention to provide a novel stripping machine which includes an input conveyor, feed rollers, a stripping blade shaft with transversely adjustable stripping blades and delivery rollers which all function in unison through a single motor for completely synchronized operation throughout the equipment.

It is a further object of the present invention to provide a novel stripping machine including a delivery conveyor, feed rolls, a stripping blade shaft and spaced stripping blades, a waste turning baffle and a waste conveyor receiving the stripped waste material from the baffle to remove the waste in a continuous manner.

It is another object of the present invention to provide a novel automatic stripping machine designed to completely eliminate manual air hammer stripping or other manual stripping operations.

It is another object of the present invention to provide a novel, continuous stripping machine that is rugged in construction, simple in design and trouble free when in operation.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a top plan view of a stripping machine constructed in accordance with the present invention.

FIG. 2 is an enlarged, cross sectional view taken along Line 2—2 of FIG. 1, looking in the direction of the arrows.

FIG. 3 is an enlarged, partial, perspective view of the stripping section of the present invention.

FIG. 5 is a top plan view of a die cut blank of modified configuration.

DESCRIPTION OF THE PREFERRED EMBODIMENT OF THE INVENTION

Figure 4:
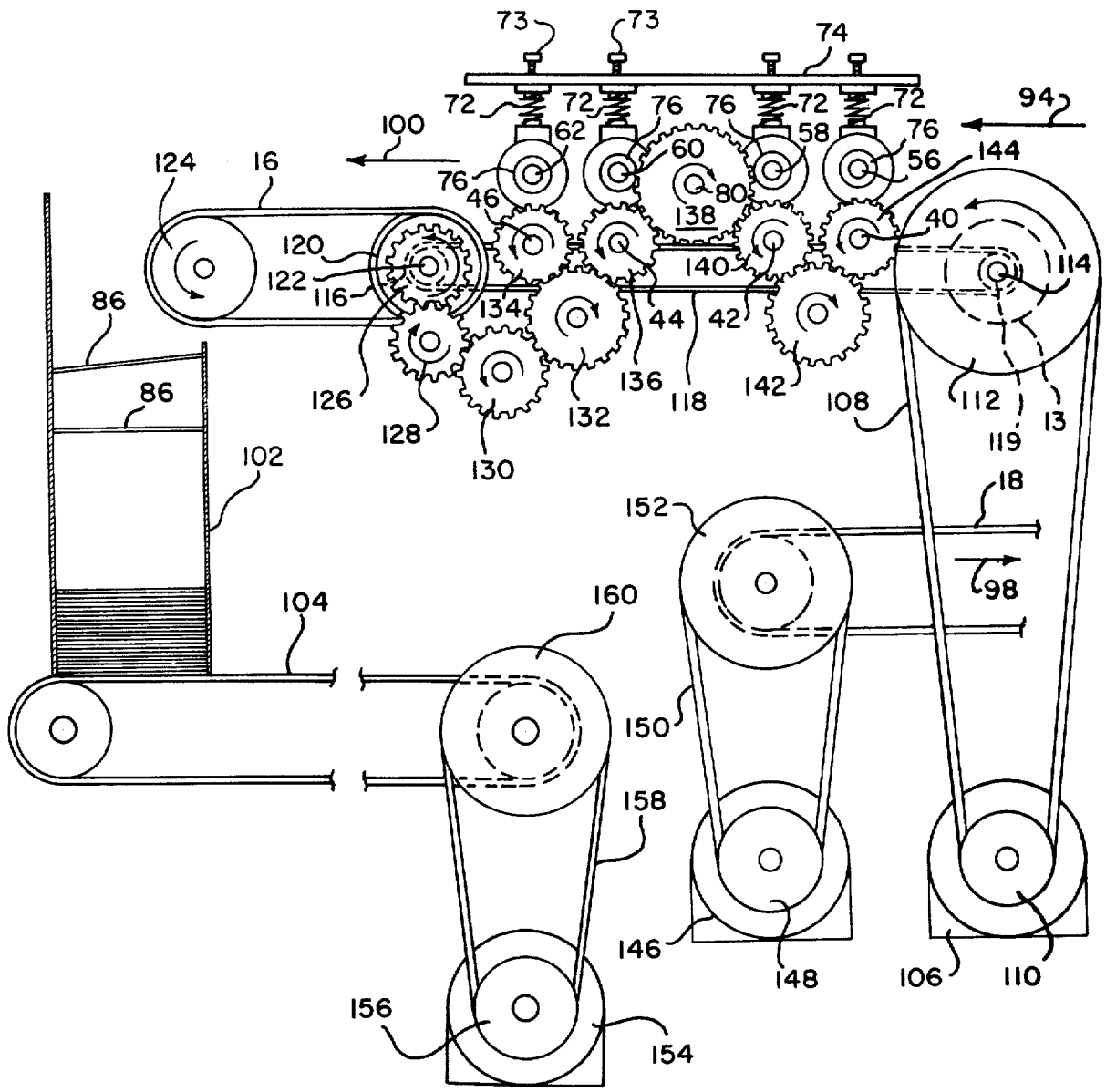
FIG. 4 is an enlarged, partial, side elevational view taken at the stripping end of the device and showing a gear drive arrangement.

Although specific terms are used in the following description for the sake of clarity, these terms are intended to refer only to the particular structure of my invention selected for illustration in the drawings and are not intended to define or limit the scope of the invention.

Referring now to the drawings, it will be seen that the stripping machine 10 comprises essentially a feed conveyor 12, a stripping section 14, an output conveyor 16 and a waste conveyor 18. The previously die cut sheets 20 are delivered individually by a conventional sheet feeding mechanism (not shown) to the feed conveyor 12 in well known manner and side rollers 22 may be conventionally employed if so desired. A pair of longitudinally spaced transversely adjustable guides 24,26 are conventionally supported above the feed conveyor 12 to transversely align the die cut sheets 20 as they are carried toward the stripping section 14.

The stripping section 14 positions immediately rearwardly of the feed conveyor 12 and is provided with conventional, transverse bearing means 28, 30 to conventionally journal a plurality of roller shafts which rotate in unison and carry rollers which cooperate in the stripping operation. The stripping section 14 comprises a plurality of lower, driving rollers 32,34, 36,38 which are conventionally fixed to and which are rotatively turned by their respective driving shafts 40,42,44,46. Cooperating driven rollers 48, 50,52,54 are conventionally fixed to and rotate upon the respective driven shafts 56,58,60,62. The driven rollers 48,50,52,54 respectively vertically align over the driving rollers 32,34,36,38 and are simultaneously rotated thereby. The cooperating pairs of driving and driven rollers 32,48;34,50; 36,52; and 38,54 define sheet receiving nips 64,66,68,70 therebetween for sheet receiving and driving purposes.

The respective driving and driven rollers may be fabricated of hard rubber or plastic and can be of the segmented type as illustrated in FIGS. 1 and 3, or optionally, may be cylindrical type rollers (not shown) if so desired, without any loss of function. The driven roller shafts 56,58,60,62 are conventionally continuously urged downwardly to bias the driven rollers 48,50,52,54 against the respective driving rollers 32,34,36,38 to assure positive, sheet driving action. Compression springs 72 which bias between a portion of the machine frame 74 and the shaft transverse bearing means 28,30 may be employed for this purpose. Adjustable bolts 73 are conventionally employed to adjust the bias of the springs 72 when so desired. As best observed in FIG. 2, the various nips 64,66,68,70 which are defined between respective driving and driven roller pairs horizontally align with the top surface 78 of the feed conveyor 12 to thereby receive the front portions of the die cut sheets 20 in straight line relationship in the same horizontal plane of travel. A transverse, stripper blade shaft 80 positions intermediate the forward pair of driving and driven rollers 32,48,34,50 and the rearward positioned pair of driving and driven rollers 36,52 and 38,54 for stripping purposes. A plurality of transversely adjustable, relatively thin, metallic, circular, stripping blades 82 are rotatively carried upon upon the stripping blade shaft 80 and are transversely adjustable thereon by means of set screws (not shown) or other conventional, easily adjustable fastening devices.

As best seen in FIG. 2, the geometry of the system is such that the diameter of each stripping blade 82 is greater than the diameter of the driven rollers 48,50,52,54. The stripping blade shaft 82 is journalled within the transverse bearing means 28,30 at a suitable elevation to carry the bottom periphery 84 of the stripping blades 82 below a horizontal plane drawn through the respective nips 64,66,68,70 defined between the respective pairs of driving and driven rollers.

As best shown in FIGS. 1 and 5, each die cut sheet 20,20' is previously die cut or otherwise treated to provide a plurality of individual die cut finished products 86,86' of the desired configuration suitable for the end purpose for which the product 86 is being formed. The remaining material of the blank 20,20' intermediate the finished products 86,86' is waste material 88,88' which will be automatically removed upon operation of the stripping machine 10 in accordance with the teaching of this specification. The dies (not shown) of the die cutting machine (not shown) are so designed and so arranged as to align the finished products 86,86' in longitudinally extending rows 90,90' which are defined on either side of longitudinally extending, transversely spaced waste material strips 92,92' which are approximately preferably ½ inch in width. It is the essence of this invention to transversely position the stripping blades 82 upon the stripping blade shaft 80 in longitudinal alignment with the various waste material strips 92,92'. As previously stated, the guides 24,26 serve to maintain the blanks 20,20' in the correct longitudinal alignment for stripping purposes. Sufficient stripping blades 82 should be employed to provide one said blade in alignment with each said waste material strip 92,92'. Thus, as the feed conveyor 12 carries the die cut sheets 20,20' toward the stripping section 14 in the direction indicated by the arrow 94, the various waste material strips 92,92' will be carried into contact with the stripping blades 82.

Still referring to FIG. 2, it will be seen that the stripping blades 82 direct the waste material strips 92 downwardly from the horizontal plane defined by the nips 64,66,68,70. A forwardly curved baffle 96 receives the waste from the stripping blades 82 and directs the waste material strips 92, 92' toward the waste conveyor 18 which is driven in the direction of the arrow 98 to deliver the waste material to a convenient point of disposal (not shown).

Following stripping of the waste material 92,92' at the stripping blades 82, the finished products 86,86' pass between adjacent stripping blades 82 and proceed forwardly through the nips 68,70 of the respective rearwardly located pairs of driving and driven rollers 36,53 and 38,54, which pairs serve to deliver the finished products 86,86' upon the output conveyor 16. The output conveyor 16 carries the finished products 86,86' rearwardly in the direction of the arrow 100 (FIG. 2) to a desired point of delivery, for example, a vertical stacking rack 102. If desired, a finished product conveyor 104 may be employed in conjunction with the vertical stacking rack 102 to further automate the operation and to facilitate packing and delivery.

Referring now to FIG. 4, a preferred type of drive for the stripping machine 10 will now be described. A first motor 106 drives an endless belt 108 through a conventional drive pulley 110. The belt 108 in turn rotates the power pulley 112 about its shaft 114. By means of a conventional drive pulley mechanism 13, the power pulley 112 rotates the feed conveyor 12 to carry the previously die cut sheets 20 rearwardly in the direction of the arrow 94. The power pulley 112 is conventionally connected to a secondary power pulley 116 in well known manner, such as by employing an endless belt 118 and a power take off pulley 119. The second power pulley 116 conventionally rotates the output conveyor 16 in the direction of the arrow 100 by turning the output conveyor pulley 120 about its shaft 122. The output conveyor 16 conventionally turns about the output conveyor pulley 120 and the rearwardly positioned idler pulley 124.

The second power pulley 116 additionally rotates the drive gear 126 which serves to power a gear train comprising the driven gears 128,130,132, 134,136,138,140,142, and 144. It will be noted that the driven gear 134 affixes to the driving shaft 46, the driven gear 136 is affixed to the driving shaft 44, the driven gear 140 is affixed to the driving shaft 42 and the driven gear 144 is affixed to the driving shaft 40 in the manner to cause the respective driving rollers 32,34,36,38 to simultaneously revolve. The gear train further includes the driven gear 138 which is pinned or otherwise affixed to the stripping blade shaft 80 to thereby simultaneously revolve the stripping blade 82 when the driving and driven rollers are rotated. Accordingly, the entire stripping machine is synchronized in operation in that the first motor 106 simultaneously powers the feed conveyor 12, the output conveyor 16, all of the driving and driven rollers in the stripping section 14 and all of the stripping blades 82. By employing conventional gear design principles, the gears 134,136,140 and 144 are driven at uniform speed to thereby revolve all of the driving and driven rollers at uniform speed.

A second motor 146 conventionally powers the waste conveyor 18 in the direction of the arrow 98 (FIG. 4) by employing a suitable drive arrangement such as a drive pulley 148, which rotates an endless belt 150 to turn the power pulley 152 of the waste conveyor 18. Similarly, a third motor 154 drives the finished product conveyor 104 through a drive pulley 156 which conventionally serves to rotate the endless belt 158 to energize the finished product conveyor power pulley 160 for conveyor 104 operation.

Although I have described my invention with a certain degree of particularity, it is understood that the present disclosure has been made only by way of example and that numerous changes in the details of construction and the combination and arrangement of parts may be resorted to without departing from the scope of the invention.

I claim:

1. In a stripping machine suitable to separate the waste material from the finished product in previously die cut sheets, the combination of
    A. feed conveyor means to carry the die cut sheets rearwardly through the machine in a generally horizontal plane;
    B. stripping means receiving the die cut sheets from the waste conveyor means to remove the waste material,
        1. said stripping means including roller means to convey the die cut sheets rearwardly through the machine,
            a. said roller means having nips in alignment with the said horizontal plane,
        2. said stripping means comprising a rotating stripping shaft and a plurality of transversely spaced, rotating, transversely adjustable, circular stripping blades mounted upon the stripping shaft and being rotated thereby,
            a. said stripping blades including a bottom periphery which extends below the said horizontal plane,
            b. the said finished product being carried rearwardly by the roller means in the horizontal plane intermediate the spaced stripping blades,
            c. the stripping machine defining an open area below the stripping blades whereby the waste material is urged downwardly through the open area to a point of disposal, and
            d. the stripping means having no support structure positioned below the sheets to support the sheets as the waste material is separated.

2. The stripping machine of claim 1 wherein the stripping blades are formed of solid, rigid material, said stripping blades having a continuous, curved periphery for contacting the waste material.

3. The stripping machine of claim 2 wherein the waste material is in continuous rolling contact with the periphery of the stripping blades as the sheets pass through the stripping means, the finished product passing horizontally forwardly intermediate the stripping blades, the stripping blades forcing the waste material downwardly out of the said horizontal plane.

4. The stripping machine of claim 3 and a curved baffle mounted on the machine and positioned below the stripping blades, said baffle receiving and turning the waste material from the stripping means to a point of disposal.

5. The stripping machine of claim 4 wherein the baffle curves in a direction towards the feed conveyor means.

6. The stripping machine of claim 5 wherein the curvature of the baffle is sufficient to turn the waste material through 180°.

* * * * *